(12) United States Patent
Aggarwal

(10) Patent No.: US 8,204,818 B1
(45) Date of Patent: Jun. 19, 2012

(54) HYBRID ONLINE AUCTION

(75) Inventor: Gagan Aggarwal, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 562 days.

(21) Appl. No.: 12/041,524

(22) Filed: Mar. 3, 2008

(51) Int. Cl.
G06Q 40/00 (2006.01)
(52) U.S. Cl. ........................................ 705/37
(58) Field of Classification Search .................. None
See application file for complete search history.

(56) References Cited

U.S. PATENT DOCUMENTS

| 6,285,999 | B1 | 9/2001 | Page | |
|---|---|---|---|---|
| 2005/0137939 | A1* | 6/2005 | Calabria et al. | 705/26 |
| 2008/0097838 | A1* | 4/2008 | Lin et al. | 705/14 |

OTHER PUBLICATIONS

Joisa C. Dutra, Flavio M. Menezes, "Hybrid Auctions", Economics Letters, 2002, pp. 1-7.*

Aggarwal, G. "Privacy Protection and Advertising in a Networked World." 'A Dissertation Submitted to the Department of Computer Science and the Committee on Graduate Studies of Standard University in Partial Fulfillment of the Requirements for the Degree of Doctor of Philosophy,' PhD Thesis, Stanford University, 2005.
Brin, S. and Page, L., "The Anatomy of a Large-Scaie Hypertextual Web Search Engine." In: Seventh International World-Wide Web Conference (WWW 1996), Apr. 14-18, 1998, Brisbane, Australia.
Varian, Hr. "Position Auctions." ScienceDirect, International J. of Industrial Organization 25 (2007) 1163-1178.

* cited by examiner

Primary Examiner — Thu-Thao Havan
Assistant Examiner — Jennifer Liu
(74) Attorney, Agent, or Firm — Fish & Richardson P.C.

(57) ABSTRACT

Methods, systems, and apparatus, including computer program products. First auction bids of a first type and second auction bids of a second type for placement of content items are received. Each of the first and second auction bids received including a corresponding bid price. The first auction bids are assigned to bid positions according to the corresponding bid prices. The second auction bids are assigned to bid positions according to a profit measure associated with each of the second bids and the bid positions. The assigned positions of the first and second bids define results of an auction for the placement of the content items.

9 Claims, 6 Drawing Sheets

HYBRID ONLINE AUCTION

BACKGROUND

This document relates to online auctions.

The rise of the Internet has enabled access to a wide variety of content items, e.g., video and/or audio files, web pages for particular subjects, news articles, etc. Such access to these content items has likewise enabled opportunities for targeted advertising. For example, content items of particular interest to a user can be identified by a search engine in response to a user query. One example search engine is the Google search engine provided by Google Inc. of Mountain View, Calif., U.S.A. The query can include one or more search terms, and the search engine can identify and, optionally, rank the content items based on the search terms in the query and present the content items to the user (e.g., according to the rank). This query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. As the users are likely interested in the particular content on the publisher webpage, they are also likely to be interested in the product or service featured in the advertisement. Accordingly, such targeted advertisement placement can help drive online customers to the advertiser's website.

A limited number of advertisements can be presented on web pages. Therefore, an auction can be performed to determine which advertisements should be presented in the positions that are available on a particular webpage. Advertisers can submit bids that represent the price that the advertiser is willing to pay to occupy a position on the webpage. The bids can be a price that the advertiser will pay per action unit (e.g., a click, a defined number of impressions, or a conversion). In turn, the advertisers having the highest bids are assigned positions on the webpage.

SUMMARY

In general, one aspect of the subject matter described in this specification can be embodied in a method of conducting a hybrid auction. The method of conducting a hybrid auction can include the actions of receiving first auction bids of a first type and second auction bids of a second type for placement of content items, each of the first and second auction bids including a corresponding bid price; assigning the first auction bids to bid positions according to the corresponding bid prices; and assigning the second auction bids to bid positions according to a profit measure associated with each of the second bids and the bid positions; wherein the assigned positions of the first and second bids define results of an auction for the placement of the content items. Other embodiments of this aspect include corresponding systems, apparatus, and computer program products.

These and other implementations can optionally include one or more of the following features. The method can include the action of determining an actual cost per click associated with each of the assigned positions of the first and second bids. The second bids can be assigned to bid positions according to the profit measure by determining the profit measure for a bid position based on a profit bid price that is the maximum of a bid price of an auction bid of the first type that is directly below the bid position; and a virtual bid based on the next lowest bid price of an auction bid of the second type that is nearest the bid position. The actual cost per click can be determined for the first and second bids in ascending order. The actual cost per click can be determined by setting the actual cost per click associated with an assigned position to a maximum of a bid price of an auction bid of the first type that is directly below the bid position; and a virtual bid based on the next lowest bid price of an auction bid of the second type that is nearest the bid position. The auction bids of the first type can be generalized second price auction bids and the auction bids of the second type can be Vickery-Clarke-Groves auction bids.

Particular embodiments of the subject matter described in this specification can be implemented so as to realize one or more of the following advantages. One advantage realized is the facilitation of a hybrid auction using different bid types (e.g., truthful and non-truthful). Another advantage realized that if bids are only received for a particular type of auction, the hybrid auction collapses into that auction type (e.g. if all received bids are Generalized Second Price auction bids, then the auction becomes a Generalized Second Price auction). These advantages can be separately realized or realized in combination in various implementations.

These various optional advantages and features can be separately realized and need not present in any particular embodiment. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
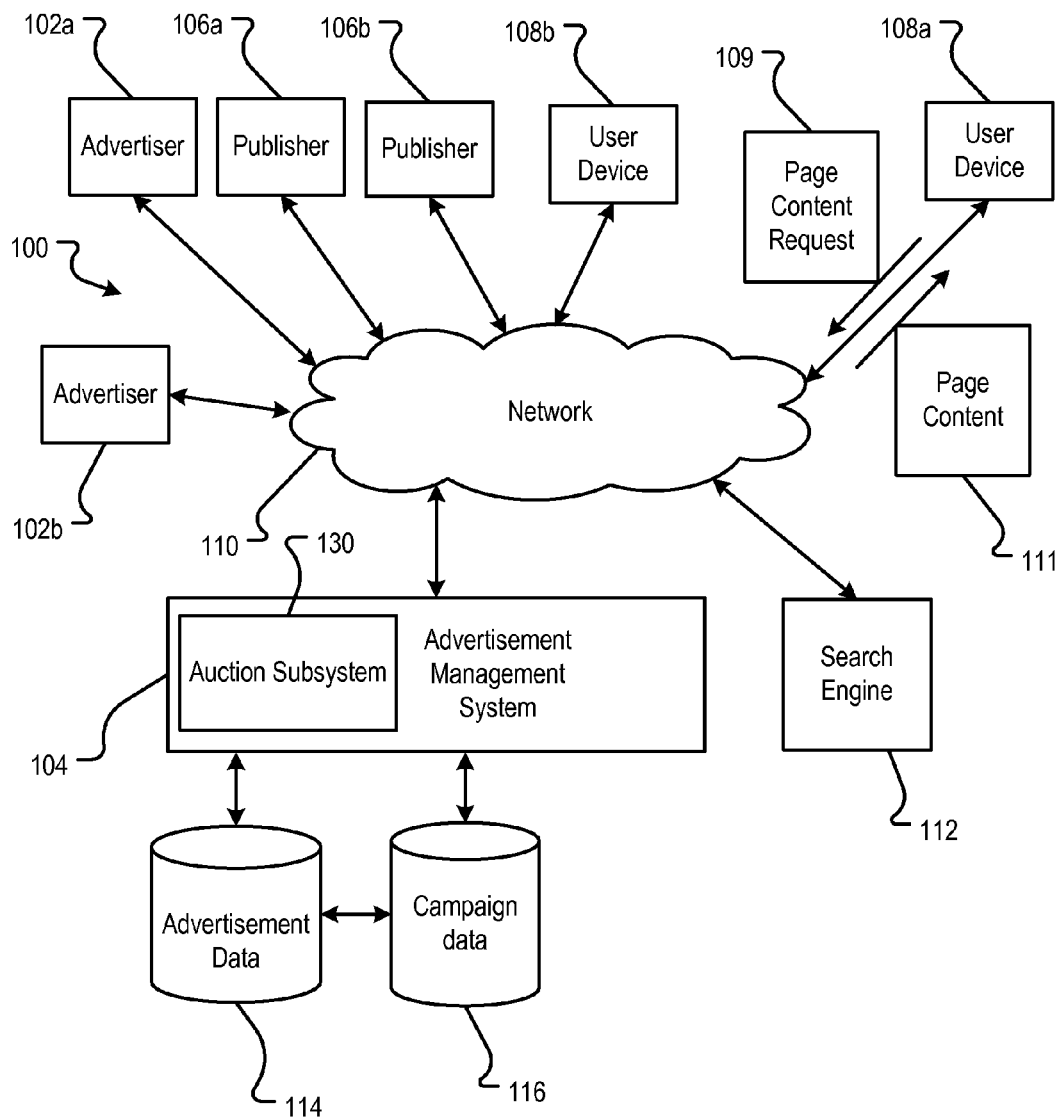
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102a and 102b, an advertisement management system 104, publishers 106a and 106b, user devices 108a and 108b, and a search engine 112.

Although only two advertisers (102a and 102b), two publishers (102a and 102b) and two user devices (108a and 108b) are shown, the online environment 100 may include many thousands of advertisers, publishers and user devices.

§1. Advertisement Publishing and Tracking

In some implementations, one or more advertisers 102a and/or 102b can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement document 120. The advertisements may also include embedded information, such as a links, meta-information, and/or machine executable instructions, such as HTML or JavaScript™

A user device, such as user device 108a, can submit a page content request 109 to a publisher or the search engine 112. In some implementations, the page content 111 can be provided to the user device 108a in response to the request 109. The page content can include advertisements provided by the advertisement management system 104, or can include executable instructions, e.g., JavaScript™, that can be executed at the user device 108a to request advertisements from the advertisement management system 104. Example user devices 108 include personal computers, mobile communication devices, television set-top boxes, etc.

Advertisements can also be provided from the publishers 106. For example, one or more publishers 106a and/or 106b can submit advertisement requests for one or more advertisements to the system 104. The system 104 responds by sending the advertisements to the requesting publisher 106a or 106b for placement on one or more of the publisher's web properties (e.g., websites and other network-distributed content). The advertisements can include embedding links landing pages, e.g., pages on the advertisers 102 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content 109 and advertisements can be sent to the user device 108 that requested the content (e.g., user device 108a) as page content 111 for presentation in a viewer (e.g., a browser or other content display system). The publisher 106 can transmit information about the advertisements back to the advertisement management system 104, including information describing how, when, and/or where the advertisements are to be rendered (e.g., in HTML or JavaScript™).

Publishers 106a and 106b can include general content servers that receive requests for content (e.g., articles, discussion threads, music, video, graphics, search results, web page listings, information feeds, etc.), and retrieves the requested content in response to the request. For example, content servers related news content providers, retailers, independent blogs, social network sites, or any other entity that provides content over the network 110 can be a publisher. Advertisements can also be provided through the use of the search engine 112.

The search engine 112 can receive queries for search results. In response, the search engine 112 can retrieve relevant search results from an index of documents (e.g., from an index of web pages). An exemplary search engine 112 is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111.

The search results can be maintained as distinct from the advertisements, so as not to confuse the user between paid advertisements and presumably neutral search results.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

§2. Advertisement Auctioning

In addition to the advertisements being selected based on content such as a search query or web page content of a publisher, the advertisements can also be selected from an auction. In one implementation, the advertisement management system 104 includes an auction subsystem 130. Advertisers 102 may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $1.00, and the maximum amount advertiser C will pay is $0.75.

The bids that are received from the advertisers can be used by the auction subsystem 130 to perform different types of auctions to select advertisements. The type of auction performed can determine the price that an advertiser pays for a particular position in the auction. The auction subsystem 130 can perform auctions that can be truthful or non-truthful. Truthful auctions are auctions that provide an incentive for each bidder to submit a bid that represents the true value that the bidder associates with the item being auctioned. An example of a truthful auction is a Vickery-Clarke-Groves (VCG) auction. Non-truthful auctions are auctions that do not provide an inventive for each bidder to submit a bid that represents the true value that the bidder associates with the item being auctioned. An example of a non-truthful auction is a Generalized Second Price (GSP) auction.

An auction subsystem can generally facilitate performance of auctions with different auction bid types (e.g., VCG and GSP) by using two auction engines. However, the auctions for each bid type will be performed separately from the auction for the other bid type. The auction subsystem 130 can receive multiple bid types (e.g., GSP and VCG) and perform a hybrid auction that uses both bid types in a single auction. Accordingly, advertisers are not required to change their bid type to participate in the hybrid auction. In some implementations, if the auction subsystem 130 only receives bids of one type (e.g., GSP bids) then the hybrid auction can be collapsed into a GSP auction.

The auction types that can be performed by the auction subsystem 130 are discussed below. First, the GSP auction is discussed. Next, the VCG auction is discussed. Finally, the hybrid auction is discussed.

§2.1 Generalized Second Price Auction

In a GSP auction, the actual cost-per-click each advertiser pays is based on the bid price of the advertiser that is in the next lowest rank position, as illustrated above. The GSP auction is not a truthful auction because an advertiser's optimal bid is not based on the true value that the advertiser realizes per click. Thus, an advertiser may have an incentive to bid less than the advertiser's true value per click, resulting in auction results that do not reveal the true value of the advertisement position. Similarly, an advertiser may even have an incentive to submit a bid price that is low enough to result in the advertiser occupying a lower auction position.

One way of determining an advertiser's incentive to bid a particular price for an advertisement position is to determine the profit per impression that the advertiser realizes at each auction position. The profit per impression that an advertiser realizes at each auction position can be determined, for example, according to equation 1:

$$\text{profit/impression} = (\text{value/click} - \text{price/click}) * \text{click/impression} \quad \text{Equation 1}$$

For example, three advertisers can bid on two advertisement positions. The first advertisement position can have a click-through-rate performance of 0.5 (e.g., 5 clicks for every 10 impressions) and the second advertisement position can have a click-through-rate performance of 0.4 (e.g., 4 clicks for every 10 impressions). The advertisers A, B, and C can each determine a value for each click of $10/click, $6/click, and $2/click, respectively. The advertisers can submit an auction bid that is equal to its determined value/click or some other amount. Assuming equal quality scores for the advertisements, if each of these advertisers submits a bid that corresponds to the advertiser's value/click, then advertiser A will pay an actual cost per click of $6/click (e.g., the bid of advertiser B) and advertiser B will pay an actual cost per click of $2/click (e.g., the bid of advertiser C). Based on the actual cost per click that the advertisers will pay, advertiser A will make an expected profit per impression of $2, according to equation 1, above (e.g., ($10−$6)*0.5), as illustrated in Table 1.

TABLE 1

| Advertiser | Value/ Click | (−) Price/ Click | (*) Click/Impression (CTR) of position 1 | (=) Expected Profit/Impression |
|---|---|---|---|---|
| A | $10 | $6 | .5 | $2 |

However, advertiser A can lower its bid below its value/click (e.g., $10/click), for example, to $5/click so that advertiser A bids less than advertiser B. Based on the new bid, advertiser A can expect to make a profit per impression of $3.20, according to equation 1, above (e.g., ($10−$2)*0.4) and illustrated in Table 2.

TABLE 2

| Advertiser | Value/ Click | (−) Price/ Click | (*) Click/Impression (CTR) of position 2 | (=) Expected Profit/Impression |
|---|---|---|---|---|
| A | $10 | $2 | .4 | $3.20 |

The example demonstrates that advertiser A can increase its profits by bidding less than its true value/click and occupying a lower advertisement position. Accordingly, there can be an incentive for advertisers to bid lower than their true value/click in a GSP auction so that the advertiser will always have a positive profit per impression. Additionally, as demonstrated, there can also be an incentive for advertisers to bid lower than the next lowest bid to increase the advertiser's profit per impression.

§2.2 Truthful Auctions

Truthful auctions are auctions that provide an incentive for advertisers to bid the true value per click that the advertiser associates with the advertisement position. The truthful auction results in an actual cost per click for each advertisement position that is based on the true value of that advertisement position. A (VCG) mechanism is an example of a truthful auction. The VCG mechanism is truthful because each advertiser pays for the incremental value of the advertisement position relative to the other advertisement positions based on the incremental benefit that the advertisement position provides (e.g., increased click through rate). Accordingly, an advertiser cannot increase its profits in a VCG auction by lowering its bid to occupy a lower advertisement position.

A position normalizer can characterize the performance differences between different advertisement positions. The position normalizers can be used in conjunction with the price paid for other advertisement positions and the bid price submitted by the advertisers occupying those other advertisement positions to determine the incremental value of a particular advertisement position. In turn, the incremental benefit can be used to determine a price for the particular advertisement position.

For example, advertisers A, B, and C can submit bids for two advertisement positions of $10/click, $6/click and $2/click, respectively. As illustrated above, in the GSP auction advertiser A will pay $6/click while advertiser B will pay $2/click. In the VCG auction, advertiser B will still pay $2/click for position 2, but advertiser A will only pay for the value of the incremental benefit (e.g., the increased click-through-rate) associated with occupying position 1 instead of position 2, as illustrated in Table 3.

TABLE 3

| Auction Position | Advertiser | Bid | GSP Price | VCG Price |
|---|---|---|---|---|
| 1 | A | $10 | $6 | $2 + incremental value relative to position 2 (= $2.80) |
| 2 | B | $6 | $2 | $2 |
| Runner-Up | C | $2 | N/A | N/A |

In some implementations, the difference in click-through-rate for an advertisement based on the advertisement's position with respect to other advertisement positions on a web page can be represented by a position normalizer (9). The position normalizers can be determined, for example, by evaluating the click-through-rate of advertisements relative to a reference click-though-rate at a reference position. The click-through-rates associated with different positions of a web page can be determined, for example, by identifying the click-through rates of advertisements that were presented at that position, independent of the quality of the advertisement.

Position normalizers can be determined for different advertisement positions and for web page's having different configurations (e.g., number of advertisements, placement of advertisements, etc.). In some implementations, position normalizers for advertisement positions on a web page can be determined, for example, according to equation 2:

$$\theta_{s,K} = \frac{CTR_s}{CTR_K} \quad \text{Equation 2}$$

where,
$\Theta_s$ is the position normalizer for position s relative to reference position K;
$CTR_s$ is the click-through-rate of any advertisement at position s; and
$CTR_K$ is the click-through-rate of any advertisement at position K.

In the above example, position 1 has a click-through-rate of 0.5 while position 2 has a click-through-rate of 0.4. Accordingly, the position normalizer for position 1, using position 2 as the reference position, is 0.5/0.4=1.25, as illustrated in Table 4.

TABLE 4

| Position (s) | CTR | $\Theta_{s,2}$ |
|---|---|---|
| 1 | .5 | 1.25 |
| 2 | .4 | 1.00 |

This position normalizer $\Theta_{1,2}$ indicates that an advertisement placed at position 1 will have a click through rate that will be 125% of the click through rate that the advertisement would experience at position 2. The position normalizers can be used, for example, in conjunction with the price paid to occupy position 2 and the bid of the advertiser occupying position 2 to determine the price paid (e.g., actual CPC) to occupy position 1.

In a truthful auction, the actual cost per click paid by an advertiser to be placed at position 1 should reflect the value of the increased performance. Accordingly, in this case the increased cost paid by an advertiser to occupy position 1 over position 2 should reflect the 25% increase in CTR based on the value that the advertiser occupying position 2 places on each click. Therefore, an increased position normalized price will be paid by the advertiser occupying position 1 which can be the price paid by the advertiser occupying position 2 plus the increased value that the advertiser occupying position 2 would receive by occupying position 1. This insures that an advertiser cannot increase profit by lowering their bid or occupying a lower advertisement position, as discussed below.

For example, the VCG auction can determine the actual price that advertiser A will pay to occupy position 1 based on the position normalizers, actual price paid for the next lower position and the bid (e.g., value per click) of the advertiser in the next lower position according to equation 3:

$$p_s = \frac{p_{s+1}\theta_{s+1} + b_{s+1}(\theta_s - \theta_{s+1})}{\theta_s} \quad \text{Equation 3}$$

where,
$p_s$ is the price to occupy position s;
$p_{s+1}$ is the price paid by the advertiser occupying the next lower position;
$b_{s+1}$ is the bid submitted by the advertiser occupying the next lower position;
$\theta_s$ is the position normalizer for position s; and
$\theta_{s+1}$ is the position normalizer for the next lower advertisement position.

Using equation 3, the price paid by advertiser A to occupy position 1 is (2*1+6(1.25−1.0))/1.25=$2.80/click, as provided in Table 3.

The expected profit for advertiser A occupying position 1 is (10−2.8)*0.5=$3.60. However, if advertiser A lowered its bid, for example, to $2 so that it would occupy position 2, the expected profit would be (10−2)*0.4=$3.20. Thus, the profit experienced by advertiser A would be lower in position 2 than in position 1.

Thus, in a VCG auction, an advertiser cannot increase its profit by occupying a lower position because the actual CPC that the advertiser pays corresponds to the value associated with the performance of the occupied position relative to a reference position (e.g., next lowest position). Additionally, in a VCG auction the actual cost per click paid by an advertiser is not solely dependent on its bid, but is determined by the price paid for the next lowest position, the bid (e.g., value/click) of the advertiser occupying the next lowest position and the position normalizers of the positions. Accordingly, an advertiser in a VCG auction has an incentive to bid the true value that it derives from each click so that it can occupy as high of a position as possible, thereby maximizing profit.

§3. Hybrid Advertisement Auction

As illustrated, the actual price per click that an advertiser will pay in a VCG auction to occupy the next higher position can be different from the actual price per click that is paid in a GSP auction. The price paid in the VCG auction corresponds to the increased value of the advertisement position rather than solely corresponding to the bid of the advertiser that occupies the next lower advertisement position. Additionally, the bidding strategy of advertisers differ in GSP auctions and VCG auctions because, as illustrated, different bidding strategies for each of the auctions can lead to maximized profits. Therefore, GSP and VCG bids are generally used in pure GSP and pure VCG auctions, respectively, to maintain the inventive to bid the true value in the VCG auction. However, a hybrid auction can be implemented that accepts both GSP and VCG bids, while still maintaining the incentive for VCG bidders to bid the true value of each click.

Figure 2:
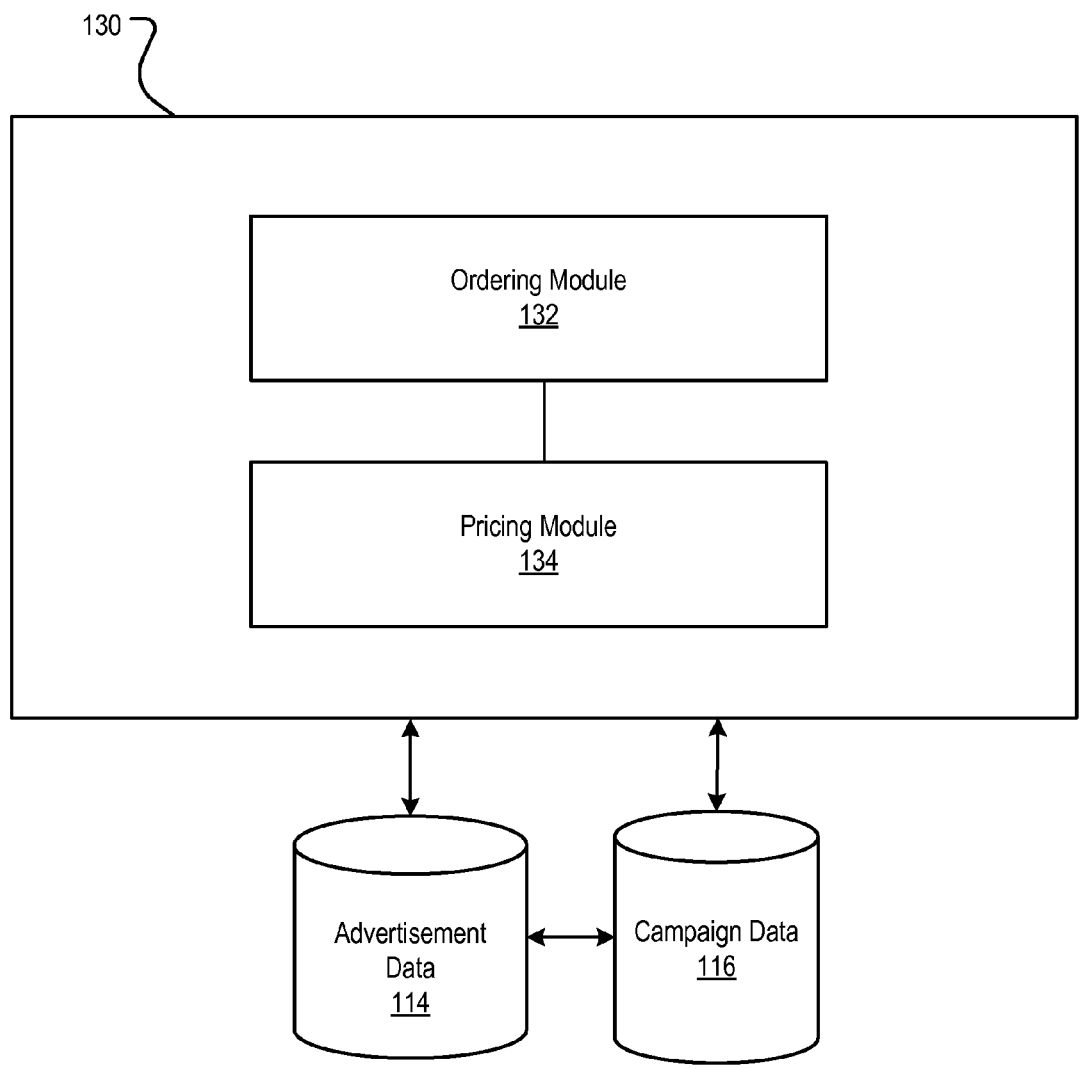
FIG. 2 is a block diagram of an example auction subsystem.

FIG. 2 is a block diagram of an example auction subsystem 130. The example auction subsystem 130 can include an ordering module 132 and a pricing module 134. In some implementations, the ordering module 132 can receive first auction bids and second auction bids, assign the first auction bids to bid positions, and assign second auction positions to bid positions. In some implementations, the pricing module 134 can determine an actual cost per click associated with each of the assigned positions of the first and second bids.

In some implementations, the auction subsystem 130 in the advertisement management system 104 can perform a hybrid auction using bids received for a truthful auction (e.g., VCG) and an auction that is not truthful (e.g., GSP). In these implementations, the auction subsystem 130 can rank bids in the hybrid auction so that advertisers submitting VCG bids continue to have an incentive to bid their true value for the advertising positions. Accordingly, the auction subsystem 130 can assign VCG bids to the best position that the advertisement can occupy based on the advertiser's VCG bid. The best position that an advertisement can occupy can be, for example, the position that maximizes profit for the advertiser.

In some implementations, the lowest advertisement positions are assigned to GSP bids in order of their maximum bid price. In turn, the lowest VCG bid can be placed in the position that maximizes the VCG bid's profit. If a GSP bid occupies that position, that GSP bid and all higher GSP bids can be shifted up. Once the first VCG bid has been placed, the actual CPC for the VCG bid and any GSP bids occupying positions below the VCG bid can be assigned. The next lowest VCG bid can then be placed in any position higher than the lowest VCG bid by determining the position that maximizes the VCG bid's profit. This placement and actual CPC assignment process can continue iteratively until all of the VCG bids are placed. In some implementations, all of the VCG bids can be placed prior to actual CPC determination.

§3.1 Bid Position Assignment

In some implementations, the ordering module 132, as illustrated in FIG. 2, can determine the position that each bid will occupy. The ordering module 132 can be implemented, for example, in the auction subsystem 130. In some implementations, the ordering module 132 can select the top k bids to occupy the bid positions, where k is, for example, the number of advertisement positions available on a webpage. For example, eight bids (e.g., A-H) can be received for six advertisement positions (e.g., 1-6) that can each have a corresponding position normalizer (e.g., $\theta_1$-$\theta_6$). The positions and the corresponding position normalizers are presented in Table 5

TABLE 5

| Position | $\theta_n$ |
|---|---|
| 1 | 1.0 |
| 2 | .90 |
| 3 | .80 |
| 4 | .75 |
| 5 | .65 |
| 6 | .50 |

As discussed above, the position normalizers represent the performance of advertisements in the advertisement positions, relative to a reference position. The normalizers in the table use position 1 as the reference position. In some implementations, position 1 can be the top position on the right hand side of a web page. Based on Table 5 above, the performance (e.g., CTR difference) experienced by an advertisement occupying position 2 will be 90% of the performance that the advertisement would experience if it occupied position 1. Additionally, the normalizers can be content independent, so that any advertisement can experience the relative performance differences represented by the normalizers regardless of the quality of the advertisement.

In some implementations, the ordering module 132 can initially rank the bids according to the maximum bid price regardless of the bid type. The maximum bid price can represent, for example, the maximum CPC that an advertiser is willing to pay. In some implementations, the maximum bid can be the maximum price that an advertiser will pay for 1000 impressions (e.g., CPM), an action (e.g., CPA), or any other bid. An example initial ranking of bids A-G including the corresponding type of bid is presented in table 6.

TABLE 6

| Position | Bid Name/Type | Bid Amount (Max CPC) |
|---|---|---|
| 1 | A/VCG | $2 |
| 2 | B/VCG | $1.20 |
| 3 | C/GSP | $.80 |
| 4 | D/VCG | $.70 |
| 5 | E/GSP | $.60 |
| 6 | F/GSP | $.50 |
| Runner-Up | G/GSP | $.49 |
| $2^{nd}$ Runner-Up | H/GSP | $.30 |

The ordering module can select the top k+1 (e.g., 7) bids from the initial ranking, where k is the number of advertisement positions available (e.g., 6). For example, the top 7 bids A-G can be selected from the received bids A-H. The ordering module 132 can use the top 7 bids to determine, for example, the positions occupied and actual prices that will be paid by the advertisers that submitted the top 6 bids.

In some implementations, the ordering module 132 places the GSP bids that are in the top k bids in the lowest positions available, in order of their bids. For example, GSP bids C, E, and F will be placed in positions 4-6, respectively, as shown in table 7.

TABLE 7

| Position | Bid Name/Type | Bid | Actual Price |
|---|---|---|---|
| 1 | Empty | | |
| 2 | Empty | | |
| 3 | Empty | | |
| 4 | C/GSP | $.80 | Not Set |
| 5 | E/GSP | $.60 | Not Set |
| 6 | F/GSP | $.50 | Not Set |

After the GSP bids are placed in the lowest positions, the lowest VCG bid in the top k bids is selected for placement. In some implementations, the ordering module 132 can place the first selected VCG bid at any position. Each subsequently selected VCG bid can be placed at any position that is higher than the previously placed VCG bid. In the above example, the first selected VCG bid is bid D because it is the lowest VCG bid.

In some implementations, the ordering module 132 determines the placement of the VCG bid by determining the position that maximizes profit associated with the VCG bid. In order to determine the position that maximizes the profit associated with the VCG bid, the ordering module 132 can determine the expected profit, according to equation 1 presented above, at each position that the VCG bid can occupy. In some implementations, the bid price used to determine the profit associated with the VCG bid in a particular position can be the maximum of:

a) the GSP bid that is in the position directly below the particular position, using a bid of 0 if there is no GSP bid in the position directly below the particular position; and b) a virtual bid associated with the VCG bid that is in the nearest position (n) below the particular position (s), using a virtual bid of 0 if there is not a VCG bid below the particular position, and using a position normalizer of 0 if the nearest VCG bid below the particular position is a runner-up bid.

The virtual bid associated with the VCG bid that is in the nearest position (n) below the particular position (s) can be determined, for example, according to equation 4:

$$virtualbid(n) = \frac{p_n \theta_n + v_n(\theta_s - \theta_n)}{\theta_s} \quad \text{Equation 4}$$

where, $p_n$=the price paid by the advertiser occupying position n $\Theta_n$=the normalizer for position n $V_n$=the value of a click (e.g., bid) for the advertiser occupying position n $\Theta_s$=the normalizer for the particular position s and where, $\Theta_n = p_n = 0$, if n>k Continuing with the example above, the ordering module 132 can determine the profits associated with each advertisement position for VCG bid D, using the maximum of the GSP bid and the virtual bid as described above. Example results of this determination are presented in Table 8. In Table 8, only GSP bids are available to determine profit for bid D at each position because there are no VCG bids that occupy positions below bid D.

TABLE 8

| Possible D Positions | GSP bid (a) | Virtual Bid (b) | Position profit using max of (a) and (b) |
|---|---|---|---|
| 1 | 0 | 0 | 0 |
| 2 | 0 | 0 | 0 |
| 3 | .80 | 0 | 0 |
| 4 | .60 | 0 | .075 |
| 5 | .50 | 0 | .130 |
| 6 | .49 | 0 | .105 |

Based on the results presented in Table 8, the profit associated with bid D is maximized at position 5. Therefore, the ordering module 132 can place bid D can be placed at position 5. In turn, GSP bids C and E can each be moved up a position so that bids C, E, D and F occupy positions 3, 4, 5 and 6, respectively, as shown in Table 9.

TABLE 9

| Position | Name/Type | Bid | Actual Price |
|---|---|---|---|
| 1 | Empty | | |
| 2 | Empty | | |
| 3 | C/GSP | $.80 | Not Set |
| 4 | E/GSP | $.60 | Not Set |
| 5 | D/VCG | $.70 | Not Set |
| 6 | F/GSP | $.50 | Not Set |

Once bid D has been placed at position 5, bid D and all bids that occupy positions below bid D are fixed because each of the remaining VCG bids are higher than bid D, as shown in Table 6. Accordingly, the remaining VCG bids will occupy positions higher than bid D. Therefore, the auction subsystem 130 can determine the actual cost per click for bids D and F, as discussed in §3.2.

In some implementations, the remaining VCG bids are placed in their respective positions prior to determination of the actual costs per click for each bid. In these implementations, the lowest VCG bid that has not been placed in a position can be selected for placement by the auction subsystem 130. Continuing with the above example, bid B is the lowest VCG bid that has not been placed, and therefore, can be placed by the ordering module 132.

In some implementations, the ordering module 132 can place bid B in positions that are higher than that occupied by bid D. Accordingly, the profit experienced by bid B at positions 1-4 can be determined, for example, in the same manner as the profit for bid D was determined. However, since bid D occupies a position that is below each of the positions available for placing bid B, then the ordering module 132 can determine a virtual bid associated with bid D for each of the positions. The virtual bid represents the price that advertiser D would be willing to pay to occupy each position available to advertiser B. The virtual bid can be determined, for example, according to equation 4, presented above, based on the incremental CTR performance that would be experienced by advertiser D at those positions, the value per click for advertiser D and the actual cost per click that advertiser D paid to occupy position 5.

The expected profit associated with bid B at each available position can be determined in the same manner as described in reference to the placement of bid D. The table below presents the virtual bid for advertiser D for each available position and the GSP bid used to determine expected profit at each position as well as the resulting expected profit based on the maximum of the GSP bid and the VCG bid. The virtual bid of advertiser D can be calculated, for example, according to the equation 4, presented above.

TABLE 10

| Possible B Positions | GSP bid (a) | Virtual bid (b) | Position Profit using max of (a) and (b) |
|---|---|---|---|
| 1 | N/A | N/A | N/A |
| 2 | .800 | .5375 | .360 |
| 3 | .600 | .5556 | .480 |
| 4 | 0 | .5267 | .505 |
| 5 | N/A | N/A | N/A |
| 6 | N/A | N/A | N/A |

Based on the example profits presented in Table 10, the ordering module 132 can place bid B in position 4, thereby maximizing the profit associated with bid B. Accordingly, bids C and E can be moved up to positions 2 and 3, respectively, as shown in Table 11.

TABLE 11

| Position | Name/Type | Bid | Actual Price |
|---|---|---|---|
| 1 | Empty | | |
| 2 | C/GSP | $.80 | Not Set |
| 3 | E/GSP | $.60 | Not Set |
| 4 | B/VCG | $1.20 | Not Set |
| 5 | D/VCG | $.70 | Not Set |
| 6 | F/GSP | $.50 | Not Set |

The ordering module 132 can repeat the placement procedure to place bid A, the last VCG bid that has not been placed. The expected profits for bid A at each available position (e.g., above position 4) are presented Table 12.

TABLE 12

| Possible A Positions | GSP Bid (a) | Virtual Bid (b) | Position profit using max of (a) and (b) |
|---|---|---|---|
| 1 | .80000 | .6950 | 1.200 |
| 2 | .60000 | .6015 | 1.287 |
| 3 | 0 | .5688 | 1.145 |
| 4 | N/A | N/A | N/A |
| 5 | N/A | N/A | N/A |
| 6 | N/A | N/A | N/A |

Based on the expected profits for bid A, position 2 maximizes profit for bid A. Accordingly, the ordering module 132 can place bid A in position 2 and move bid C to position 1, resulting in the placement of bids shown in Table 13.

TABLE 13

| Position | Name/Type | Bid | Actual Price |
|---|---|---|---|
| 1 | C/GSP | $.80 | Not Set |
| 2 | A/VCG | $2.00 | Not Set |
| 3 | E/GSP | $.60 | Not Set |
| 4 | B/VCG | $1.20 | Not Set |
| 5 | D/VCG | $.70 | Not Set |
| 6 | F/GSP | $.50 | Not Set |

In some implementations, the position assignment can be performed with respect to the position normalizers rather than the advertisement position. For example, a bid that occupies position 1 in the example above would occupy the position associated with the highest position normalizer. Assuming three bid positions (e.g., 1, 2, and 3) have corresponding position normalizers of 0.2, 1, and 0.4, respectively. In this situation, the lowest positioned bid will be assigned to position 1 because that position has the lowest position normalizer. The second lowest positioned bid will be assigned to position 3 because that position has the second lowest position normalizer. Similarly, the highest positioned bid will be assigned to position 2 because that position has the highest position normalizer. While particular criteria for assigning bids to positions have been disclosed, there are other criteria that can be used to determine which position a bid will occupy.

§3.2 Actual Cost Per Click

In some implementations, the pricing module 134, as illustrated in FIG. 2, can determine the actual cost per click that an advertiser will pay to occupy a particular position can. The pricing module 134 can be implemented, for example, in the auction subsystem 130. The pricing module 134 can determine the actual cost per click that an advertiser should pay for its bid to occupy the position that it was assigned, for example, by the ordering module 132.

In some implementations, once the position of a particular bid and the other bids occupying the positions below the bid are fixed, the pricing module 134 can determine the actual cost per click associated with the particular position. The actual cost per click can be determined, for example, beginning with the lowest position. Once the actual CPC for the lowest position has been determined, the pricing module 134 can determine the actual CPC for the next higher position. The pricing module 134 can iteratively continue the determination of the actual CPC until the actual CPC for each position has been determined.

In some implementations, the actual cost per click for a particular position can depend on the type of bid submitted (e.g., VCG or GSP). The actual cost per click for a GSP bid that occupies the particular position can be, for example, the maximum of 1) the maximum bid of a GSP advertiser that occupies the position directly below the particular position and 2) the virtual bid of the next lowest VCG advertiser, regardless of the position occupied.

In some implementations, the actual cost per click for a VCG bid that occupies a particular position can be determined in the same manner as the GSP bids above. For example, in Table 13 above, the actual cost per click of a position can be the bid that occupies the position directly below the position.

In other implementations, the actual cost per click for a VCG bid that occupies the particular position can be the virtual bid of the next lowest VCG bid. The virtual bid of the next lowest VCG bid can be used because the actual cost per click can represent the incremental value associated with occupying a higher position than the next lowest VCG bid. However, in these implementations, if there is no VCG bid occupying a position below the particular position, then the actual CPC can be the maximum bid of the GSP bid occupying the position directly below the particular position.

Continuing with the example above, The pricing module 134 can set the actual CPC for bid F to 0.490 because this is the max CPC of bid G, the bid occupying position 7, as shown in Table 6 (e.g., the runner-up), and there is not a VCG bid occupying a position below bid F.

Similarly, since there is no VCG bid occupying a position below bid D, the actual CPC for bid D can be set equal to the max CPC of bid F, the GSP bid occupying the position directly below bid D. Accordingly, the pricing module 134 can set the actual CPC for bid D to 0.500, which is the max CPC of bid F (e.g., the GSP bid occupying the position directly below bid D). Table 14 presents bids C, E, D, and F and actual cost per click for bids D and F.

TABLE 14

| Position | Name/Type | Bid | Actual CPC |
|---|---|---|---|
| 1 | C/GSP | .800 | Not Set |
| 2 | A/VCG | 2.00 | Not Set |
| 3 | E/GSP | .600 | Not Set |
| 4 | B/VCG | 1.20 | Not Set |
| 5 | D/VCG | .700 | .500 |
| 6 | F/GSP | .500 | .490 |

The pricing module 134 of the auction subsystem 130 can continue by determining the actual CPC for bid B because bid B occupies the next highest position. In some implementations, the actual CPC for bid B, a VCG bid, can be set equal to the virtual bid associated with bid D (e.g., the next lower VCG bid) because the virtual bid reflects the value of position 4 based on the price paid for position 5 (e.g., 0.500), occupied by bid D. The price paid for position 5 can be increased to account for the increased CTR performance for an advertisement at position 4 relative to an advertisement at position 5. Accordingly, the actual CPC ($P_s$) for bid B can be set to 0.5267, as illustrated in Table 15.

TABLE 15

| $P_{s+1}$ | $\Theta_{s+1}$ | $b_{s+1}$ | $\Theta_s$ | $P_s = (P_{s+1} * \Theta_{s+1} + b_{s+1}(\Theta_s - \Theta_{s+1}))/\Theta_s$ |
|---|---|---|---|---|
| .500 | .65 | .7 | .75 | .5267 |

Once the actual CPC for bid B has been set, the pricing module 134 can set the actual CPC for bids E, A, and C in ascending order. As discussed above, the actual CPC for bids E and C can each be, for example, the maximum of 1) the GSP bid occupying the position directly below the bid and 2) the virtual bid for the position associated with the next lowest VCG bid. Meanwhile the actual CPC for bid A will be the virtual bid associated with the next lowest VCG bid (e.g., bid B). Table 16 illustrates final bid positions, bids and actual CPCs for the bids of the example.

TABLE 16

| Position | Bid Name/Type | Bid | Actual CPC |
|---|---|---|---|
| 1 | C/GSP | .800 | .7750 |
| 2 | A/VCG | 2.000 | .6389 |
| 3 | E/GSP | .600 | .5688 |
| 4 | B/VCG | 1.200 | .5267 |
| 5 | D/VCG | .700 | .5000 |
| 6 | F/GSP | .500 | .4900 |

As illustrated, the hybrid auction can be implemented in the auction subsystem 130 so that GSP bids and VCG bids can be used in a single auction. In some implementations, the auction subsystem 130 can place the VCG bids in positions so that an incentive to bid the true value/click remains for the advertisers. This incentive can be maintained, for example, by determining the actual cost per click for the VCG bids based on the actual price paid and bid of the next lowest VCG bidder as well as the difference in performance of the position relative to the next lowest position.

In some implementations, the hybrid auction described above can receive bids corresponding to a single type of auction (e.g., GSP only or VCG only). In these implementations, the hybrid auction can collapse into the particular type of auction corresponding to the bid types (e.g., GSP or VCG). Accordingly, the pricing module 134 can assign an actual cost per click paid by each advertiser that corresponds to that particular type of auction (e.g., GSP or VCG).

The advertisements, associated usage data, and bidding parameters described above can be stored as advertisement data in an advertisement data store 114. An advertiser 102 can further manage the serving of advertisement by specifying an advertising campaign. The advertising campaign can be stored in campaign data in a campaign data store 116, which can, for example, specify advertising budgets for advertisements, when, where and under what conditions particular advertisements may be served for presentation, etc.

Figure 3:
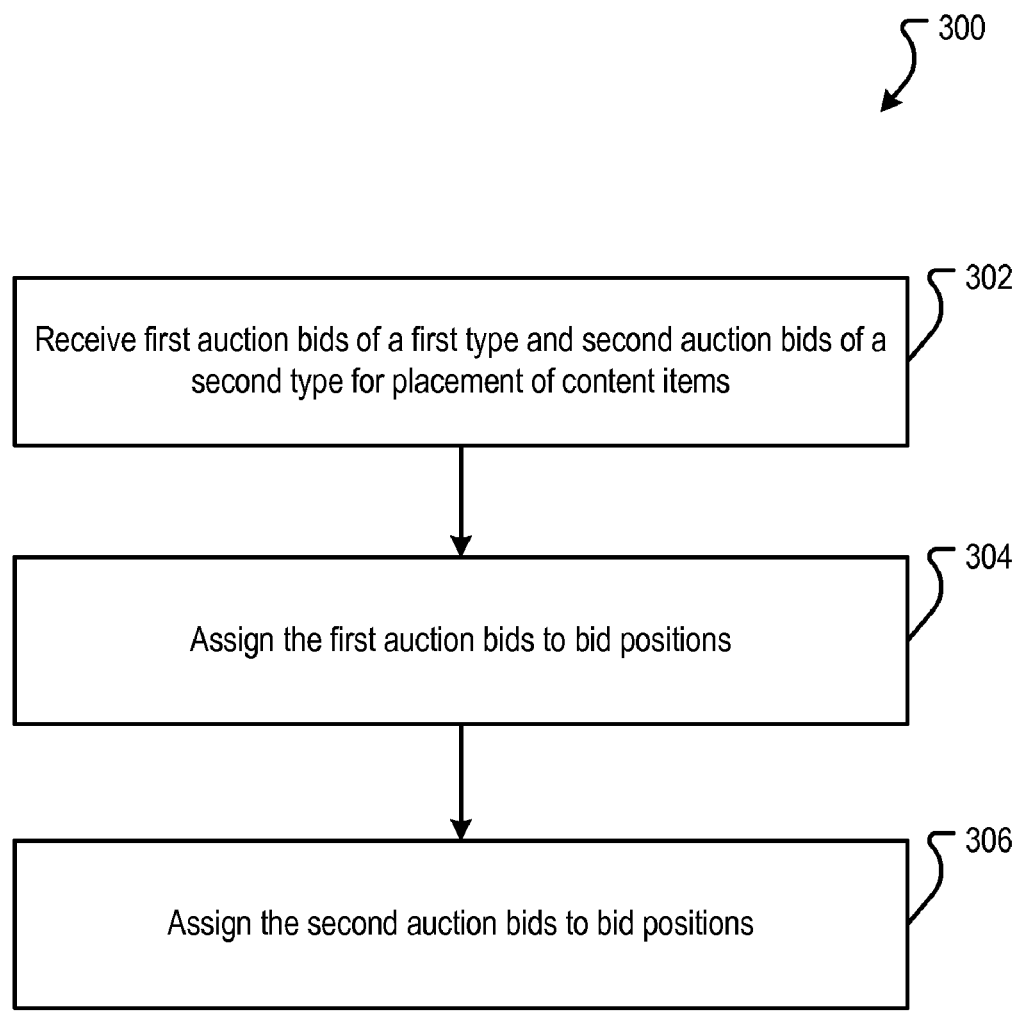
FIG. 3 is a flow chart illustrating an example process of conducting a hybrid auction.

FIG. 3 is a flow chart of an example process 300 for conducting a hybrid auction. The process 300 can, for example, be implemented in the auction subsystem 130 of FIG. 1, or in other processing devices.

Stage 302 receives first auction bids of a first type and second auction bids of a second type for placement of content items. Each of the first and second auction bids can define a corresponding bid price. For example, the ordering module 132 can receive the first and second auction bids. In some implementations, the first auction bids of the first type are generalized second price auction bids, and the second auction bids of a second type are Vickery-Clarke-Groves auction bids.

Stage 304 assigns the first auction bids to bid positions. The first auction bids can be assigned according to the corresponding bid prices of the first bids. For example, the ordering module 132 can assign the first auction bids to the bid positions.

In some implementations, the first auction bids can be assigned to the lowest bid positions.

Stage 306 assigns the second auction bids to bid positions. The second bids can be assigned according to a profit measure associated with each of the second bids and the bid positions. For example, the ordering module 132 can assign the second bids to the bid positions. In some implementations, the second bids can be assigned to the bid position where the profit measure is maximized.

Figure 4:
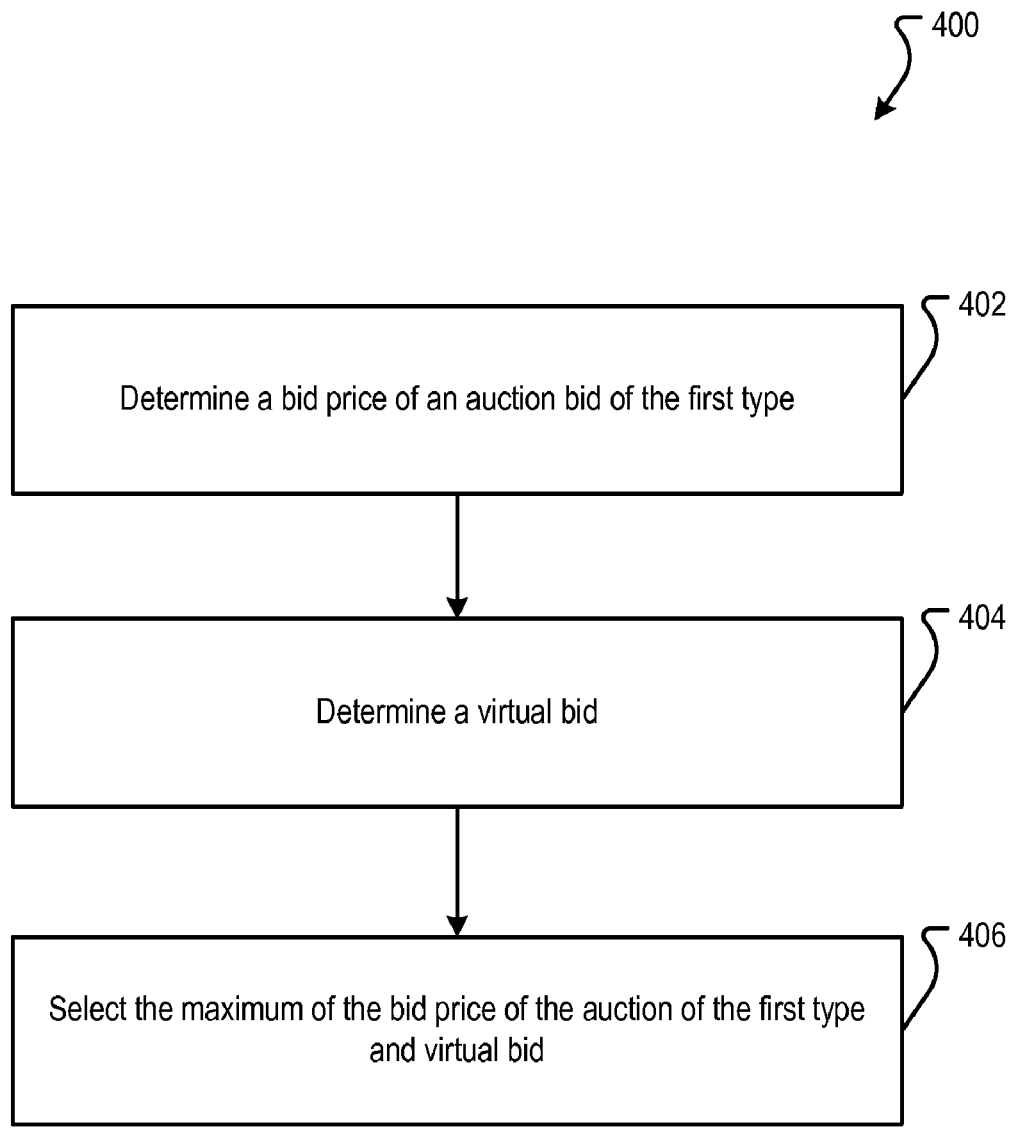
FIG. 4 is a flow chart illustrating an example process of ordering bids in a hybrid auction.

FIG. 4 is a flow chart of an example process 400 for assigning bids to bid positions according to a profit measure. The process 400 can, for example, be implemented in the auction subsystem 130 of FIG. 1, or in other processing devices.

Stage 402 determines a bid price of an auction bid of the first type. The bid price can be based on an auction bid of the first type that is directly below the bid position. For example, the ordering module 132 can determine the bid price of the auction bid of the first type. In some implementations, if there is not an auction bid of the first type directly below the bid position the bid price can be zero.

Stage 404 determines a virtual bid. The virtual bid can be based on the next lowest bid price of an auction bid of the second type that is nearest the bid position. For example, the ordering module 132 can determine the virtual bid. In some implementations, the virtual bid can be zero if there no auction bid of the second type is below the bid position.

Stage 406 selects the maximum of the bid price of the auction of the first type and virtual bid. For example, the ordering module 132 can select the maximum of the bid prices.

Figure 5:
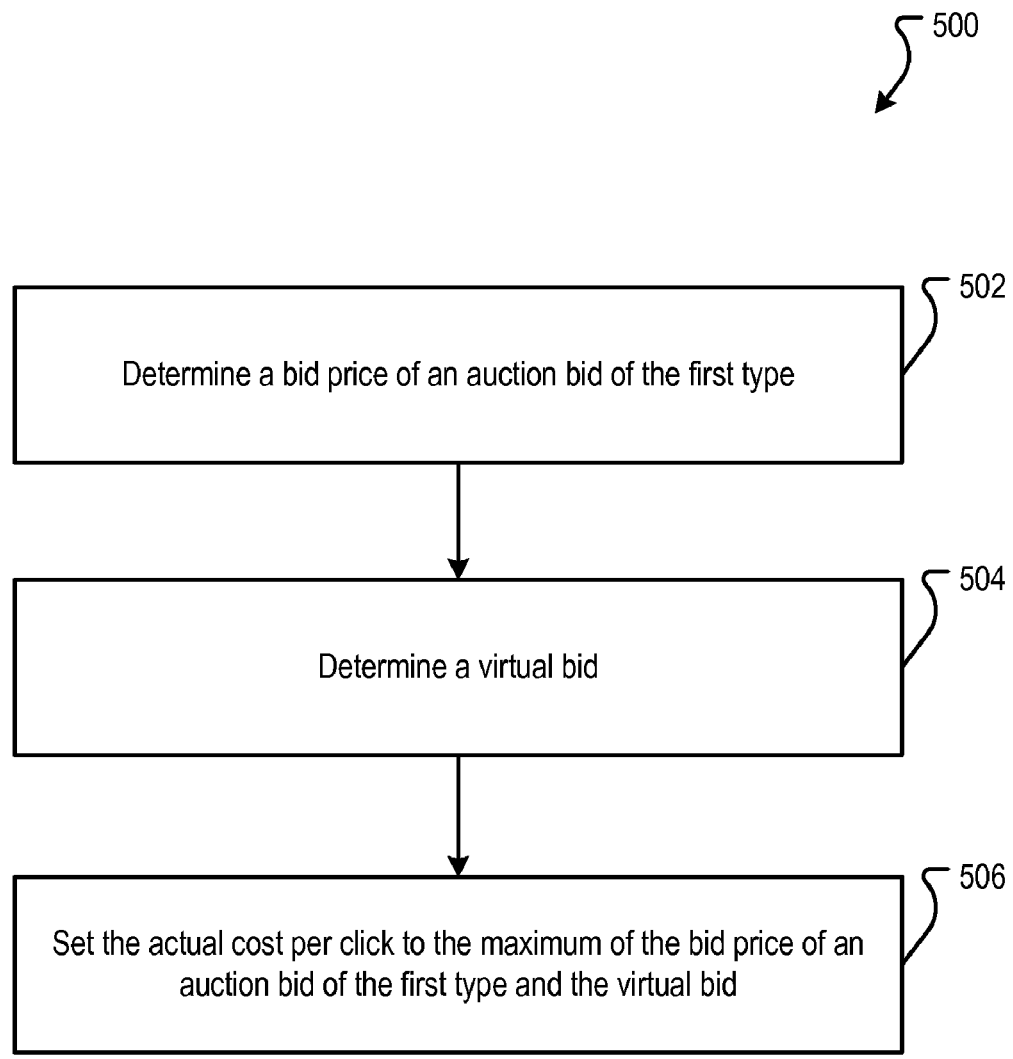
FIG. 5 is a flow chart illustrating an example process of assigning an actual cost per click to a bid.

FIG. 5 is a flow chart of an example process 500 for determining an actual cost per click associated with each of the assigned positions of the first and second bids. The process 500 can, for example, be implemented in the auction subsystem 130 of FIG. 1, or in other processing devices.

Stage 502 determines a bid price of an auction bid of the first type. The bid price can be based on an auction bid of the first type that is directly below the bid position. For example, the pricing module 134 can determine the bid price of the auction bid of the first type. In some implementations, if there is not an auction bid of the first type directly below the bid position the bid price can be zero.

Stage 504 determines a virtual bid. The virtual bid can be based on the next lowest bid price of an auction bid of the second type that is nearest the bid position. For example, the pricing module 134 can determine the virtual bid. In some implementations, the virtual bid can be zero if there no auction bid of the second type is below the bid position.

Stage 506 selects the maximum of the bid price of the auction of the first type and virtual bid. For example, the pricing module can select the maximum of the bid prices.

Figure 6:
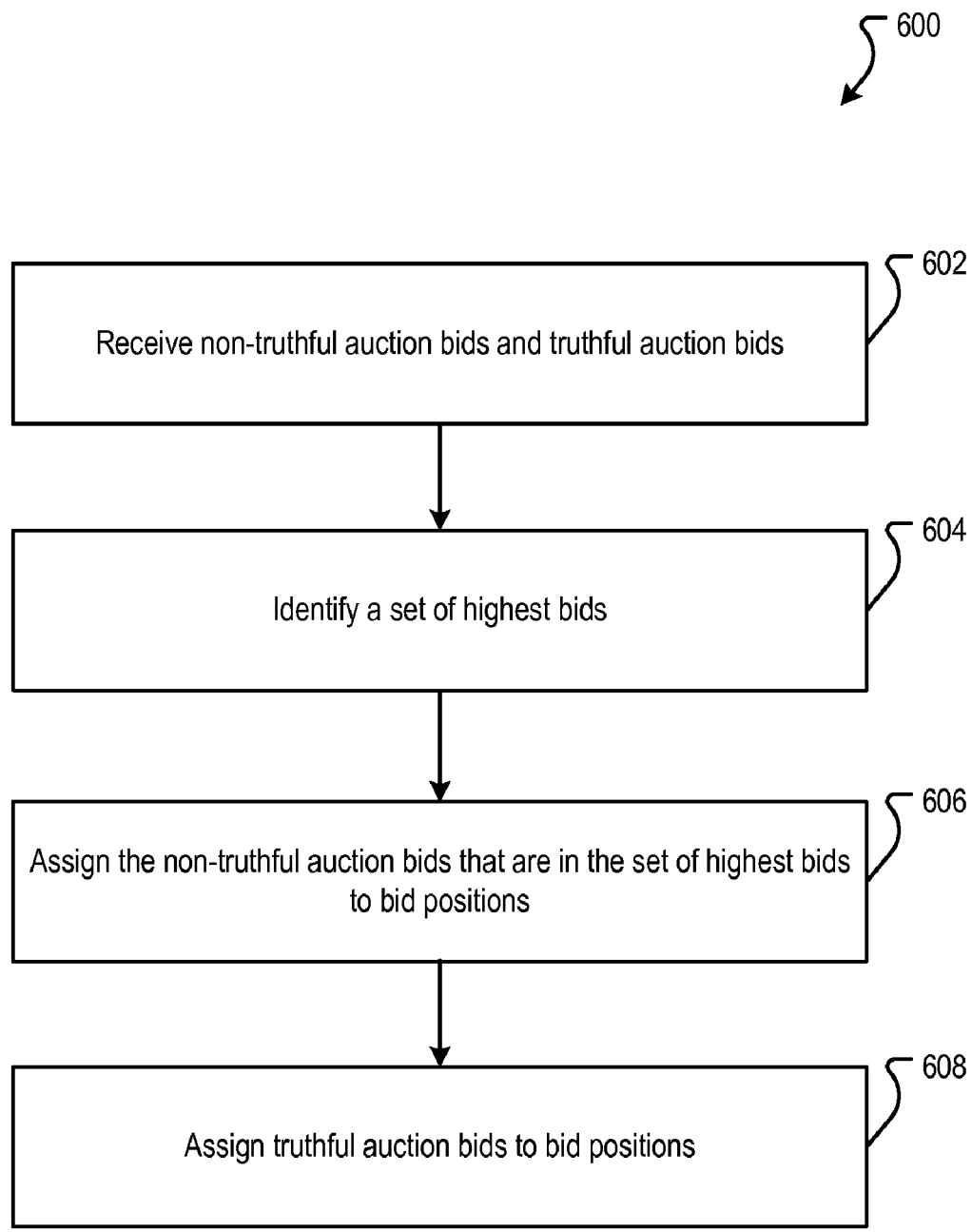
FIG. 6 is a flow chart of an example process for conducting a hybrid auction.

FIG. 6 is a flow chart of an example process 600 for conducting a hybrid auction. The process 600 can, for example, be implemented in the auction subsystem 130 of FIG. 1, or in other processing devices.

Stage 602 receives non-truthful auction and truthful auction bids. Each of the and non-truthful and truthful auction bids can define a corresponding bid price. For example, the ordering module 132 can receive the first and second auction bids. In some implementations, the non-truthful auction bids are generalized second price auction bids, and the truthful auction bids of a second type are Vickery-Clarke-Groves auction bids.

Stage 604 identifies a set of highest bids. The set of highest bids can include non-truthful and truthful auction bids. For example, the ordering module 132 can identify the set of highest bids.

Stage 606 assigns the non-truthful auction bids that are in the set of highest bids to bid positions. The non-truthful auction bids can be assigned according to a non-truthful bid value. For example, the ordering module 132 can assign the non-truthful auction bids to the bid positions. In some implementations, the first auction bids can be assigned to the lowest bid positions.

Stage 608 assigns the truthful auction bids to bid positions. The truthful bids can be assigned based on a profit measure associated with each of the truthful bids and each of the bid positions. For example, the ordering module 132 can assign the truthful bids to the bid positions. In some implementations, the truthful bids can be assigned to the bid position where the profit measure is maximized.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
  receiving, by at least one computer, first auction bids of a first auction type for first content items and second auction bids of a second auction type for second content items, each of the first and second auction bids including a corresponding bid price, the first auction type being a different auction type than the second auction type;
  ranking, by at least one computer, the first auction bids and the second auction bids, the ranking of each first auction bid and the ranking of each second auction bid being based on the corresponding bid price;
  conducting, by at least one computer, a hybrid auction using a set of highest ranked auction bids that includes a number of the ranked auction bids that corresponds to a number of available bid positions, wherein conducting the hybrid auction comprises:
    assigning, by at least one computer, the first auction bids in the set of highest ranked auction bids to the available bid positions according to the ranking of the first auction bids, wherein the first auction bids having higher rankings are assigned to higher available bid positions than the first auction bids having lower rankings; and
    assigning, by at least one computer, the second auction bids in the set of highest ranked auction bids to the available bid positions according to an advertiser profit measure for each of the second auction bids in the set of highest ranked auction bids; and
  providing content items for which the assigned auction bids were received for presentation according to an outcome of the hybrid auction.

2. The method of claim 1, wherein the auction bids of the first type are non-truthful auction bids and the auction bids of the second type are truthful auction bids, a non-truthful auction bid being a bid having a value that is lower than a value realized from assignment of a bid position, a truthful auction bid being a bid having a value that is indicative of the value realized from assignment of the bid position.

3. The method of claim 1, further comprising determining an actual cost per click for each of the available bid positions, the actual cost per click for each available position being an amount that an advertiser will pay for the available bid position based on the outcome of the hybrid auction.

4. The method of claim 3, wherein determining the actual cost per click for each of the available bid positions comprises:
  receiving a position normalizer for each of the available bid positions, each position normalizer being a value that characterizes performance differences between different bid positions; and
  setting the actual cost per click of each available bid position to a maximum of:
    a bid price of a first auction bid that is assigned to an available bid position that has a next lowest position normalizer relative to the position normalizer for the available bid position for which the actual cost per click is being set; and
    a virtual bid for a second auction bid that is assigned to an available bid position that has a position normalizer that is lower than the position normalizer for the available bid position for which the actual cost per click is being set.

5. A computer-implemented method, comprising:
  receiving, by at least one computer, non-truthful auction bids for a first auction and truthful auction bids for a second auction, each of the non-truthful bids and each of the truthful bids having a corresponding bid price, the first auction being a different type of auction than the second auction, a truthful auction bid being a bid having a value that is indicative of a value of a bid position, and a non-truthful auction bid being a bid having a value that is lower than the value of a bid position;
  identifying, by at least one computer, a set of highest bids from the non-truthful auction bids and the truthful auction bids;

conducting, by at least one computer, a hybrid auction using the set of highest bids, wherein conducting the hybrid auction comprises:

assigning, by at least one computer, each of the non-truthful auction bids that are included in the set of highest bids to available bid positions according to a bid value for the non-truthful auction bid, wherein the non-truthful auction bids having higher bid values are assigned to higher available bid positions than the non-truthful auction bids having lower bid values; and assigning, by at least one computer, the truthful auction bids to bid positions based on a profit measure for each truthful auction bid in the set of highest bids.

6. The method of claim 5, further comprising determining an actual cost per click for each of the available bid positions, the actual cost per click for each available bid position being an amount that an advertiser will pay for the available bid position based on an outcome of the hybrid auction.

7. The method of claim 6, wherein determining the actual cost per click for each of the available bid positions comprises:

receiving a position normalizer for each of the available bid positions, each position normalizer being a value that characterizes performance differences between different bid positions; and for each assigned bid position, setting the actual cost per click associated with an assigned position to a maximum of:

a bid price of a non-truthful auction bid that is assigned to an available bid position that has a next lowest position normalizer relative to the position normalizer for the available bid position for which the actual cost per click is being set; and a virtual bid for a truthful auction bid that is assigned to an available bid position that has a position normalizer that is lower than the position normalizer for the available bid position for which the actual cost per click is being set.

8. A system, comprising:

one or more computers that include an ordering module and a pricing module, wherein:

the ordering module comprises instructions executable by a the one or more computers and upon such execution cause the one or more computers to perform operations comprising:

receiving, by at least one computer, first auction bids of a first auction type for first content items and second auction bids of a second auction type for second content items, each of the first and second auction bids including a corresponding bid price, the first auction type being a different auction type than the second auction type;

ranking, by at least one computer, the first auction bids and the second auction bids, the ranking of each first auction bid and the ranking of each second auction bid being based on the corresponding bid price;

conducting, by at least one computer, a hybrid auction using a set of highest ranked auction bids that includes a number of the ranked auction bids that corresponds to a number of available bid positions, wherein conducting the hybrid auction comprises:

assigning, by at least one computer, the first auction bids in the set of highest ranked auction bids to the available bid positions according to the ranking, wherein the first auction bids having higher rankings are assigned to higher available bid positions than the first auction bids having lower rankings; and assigning, by at least one computer, the second auction bids in the set of highest ranked auction bids to the available bid positions according to an advertiser profit measure for each of the second auction bids in the set of highest ranked auction bids; and the pricing module comprises instructions executable by the one or more computers and upon such execution cause the one or more computers to perform operations comprisingdetermining an actual cost per click for each of the assigned bid positions, the actual cost per click for each assigned position being an amount that an advertiser will pay for the assigned bid position based on an outcome of the hybrid auction.

9. The system of claim 8, wherein the pricing module comprises instructions executable by the one or more computers and upon such execution cause the one or more computers to perform operations comprising:

receiving a position normalizer for each of the available bid positions, each position normalizer being a value that characterizes performance differences between different bid positions; and setting the actual cost per click of each assigned position to a maximum of:

a bid price of a first auction bid that is assigned to an available bid position that has a next lowest position normalizer relative to the position normalizer for the available bid position for which the actual cost per click is being set; and a virtual bid for a second auction bid that is assigned to an available bid position that has a position normalizer that is lower than the position normalizer for the available bid position for which the actual cost per click is being set.

* * * * *

UNITED STATES PATENT AND TRADEMARK OFFICE
CERTIFICATE OF CORRECTION

PATENT NO. : 8,204,818 B1
APPLICATION NO. : 12/041524
DATED : June 19, 2012
INVENTOR(S) : Gagan Aggarwal It is certified that error appears in the above-identified patent and that said Letters Patent is hereby corrected as shown below:

On Title Page, Column 2, Line 6, delete "Large-Scaie" and insert -- Large Scale --

In Column 21, Line 43, delete "a the" and insert -- the --

In Column 22, Line 27, delete "comprisingdetermining:" and insert -- comprising determining --

Signed and Sealed this
Fourteenth Day of August, 2012

David J. Kappos
*Director of the United States Patent and Trademark Office*